United States Patent [19]

Shiratsuchi

[11] Patent Number: 5,021,872
[45] Date of Patent: Jun. 4, 1991

[54] PHASE LOCKED SUBCARRIER REGENERATOR

[75] Inventor: Shinichi Shiratsuchi, Yokohama, Japan

[73] Assignee: RCA Licensing Corporation, Princeton, N.J.

[21] Appl. No.: 479,811

[22] Filed: Feb. 14, 1990

[30] Foreign Application Priority Data

May 26, 1989 [JP] Japan .................. 1-131715

[51] Int. Cl.$^5$ .................. H04N 9/64; H04N 9/66; H04N 11/14
[52] U.S. Cl. .................. 358/19; 358/21 R; 358/12
[58] Field of Search .................. 358/12, 17, 19, 21 R

[56] References Cited

U.S. PATENT DOCUMENTS

| | | | |
|---|---|---|---|
| 4,316,219 | 2/1982 | Smith et al. | 358/150 |
| 4,541,061 | 9/1985 | Schoon | 364/518 |
| 4,614,973 | 9/1986 | Sorenson | 358/153 |
| 4,628,286 | 12/1986 | Nossen | 332/9 |
| 4,635,279 | 1/1987 | Nossen | 375/78 |
| 4,652,832 | 3/1987 | Jasper | 328/14 |
| 4,661,850 | 4/1987 | Strolle | 358/12 |
| 4,670,786 | 6/1987 | Ricciardi | 358/149 |
| 4,751,565 | 6/1988 | Emmons | 358/19 |
| 4,769,691 | 9/1988 | Dischert | 358/19 |
| 4,788,585 | 11/1988 | Suzuki | 358/19 |

FOREIGN PATENT DOCUMENTS 189894 8/1987 Japan .
1455821 11/1976 United Kingdom .

OTHER PUBLICATIONS

Extended Definition TV Fully Compatible with Existing Standards, by T. Fukinuki, et al., Aug. 1984, IEEE Transactions on Communications, vol. COM-32, No. 8, pp. 948-953.

Primary Examiner—Tommy P. Chin
Attorney, Agent, or Firm—Joseph S. Tripoli; Eric P. Herrmann; James B. Hayes

[57] ABSTRACT

Apparatus for generating a signal having a predetermined frequency relationship with a subcarrier includes a counter for counting cycles of said subcarrier. Count values from the counter are coupled as address values to a memory circuit. The memory circuit is preprogrammed to provide a signal having the desired frequency responsive to successive address values applied by the counter.

6 Claims, 4 Drawing Sheets

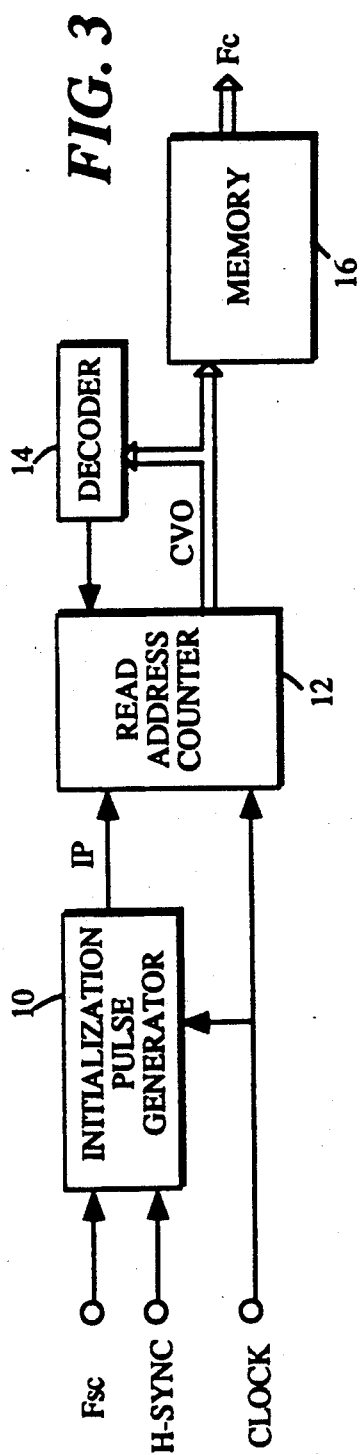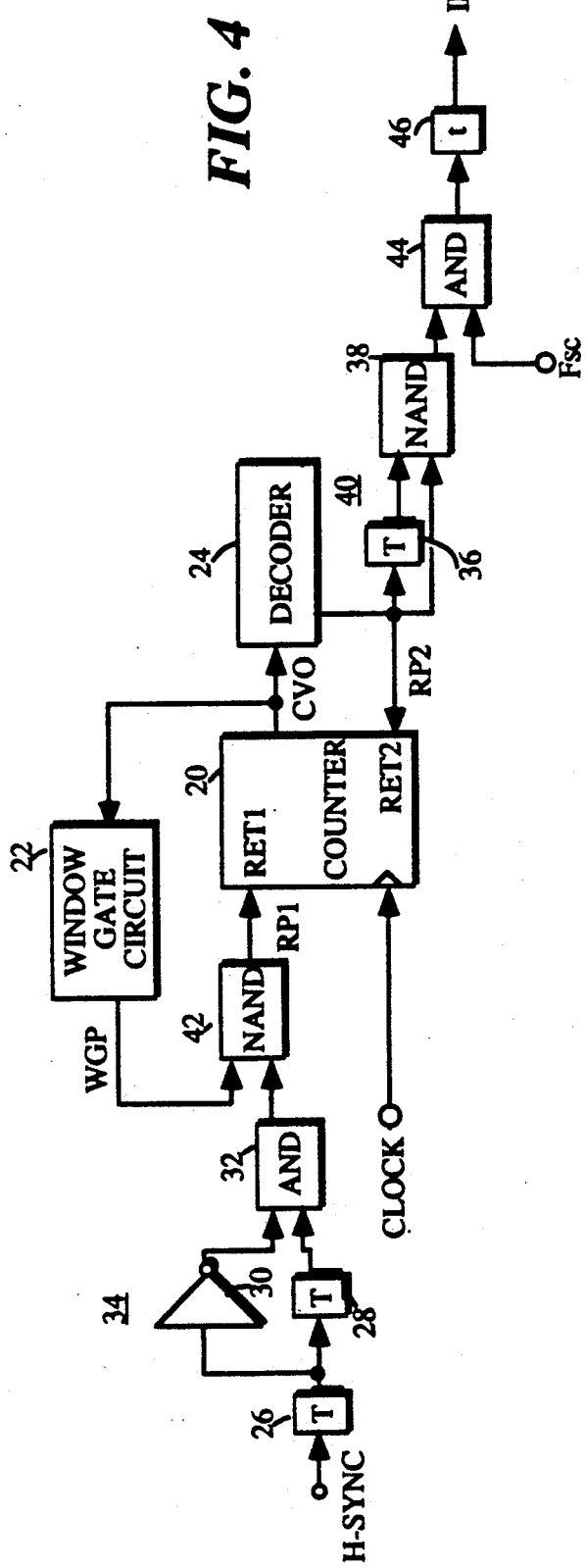

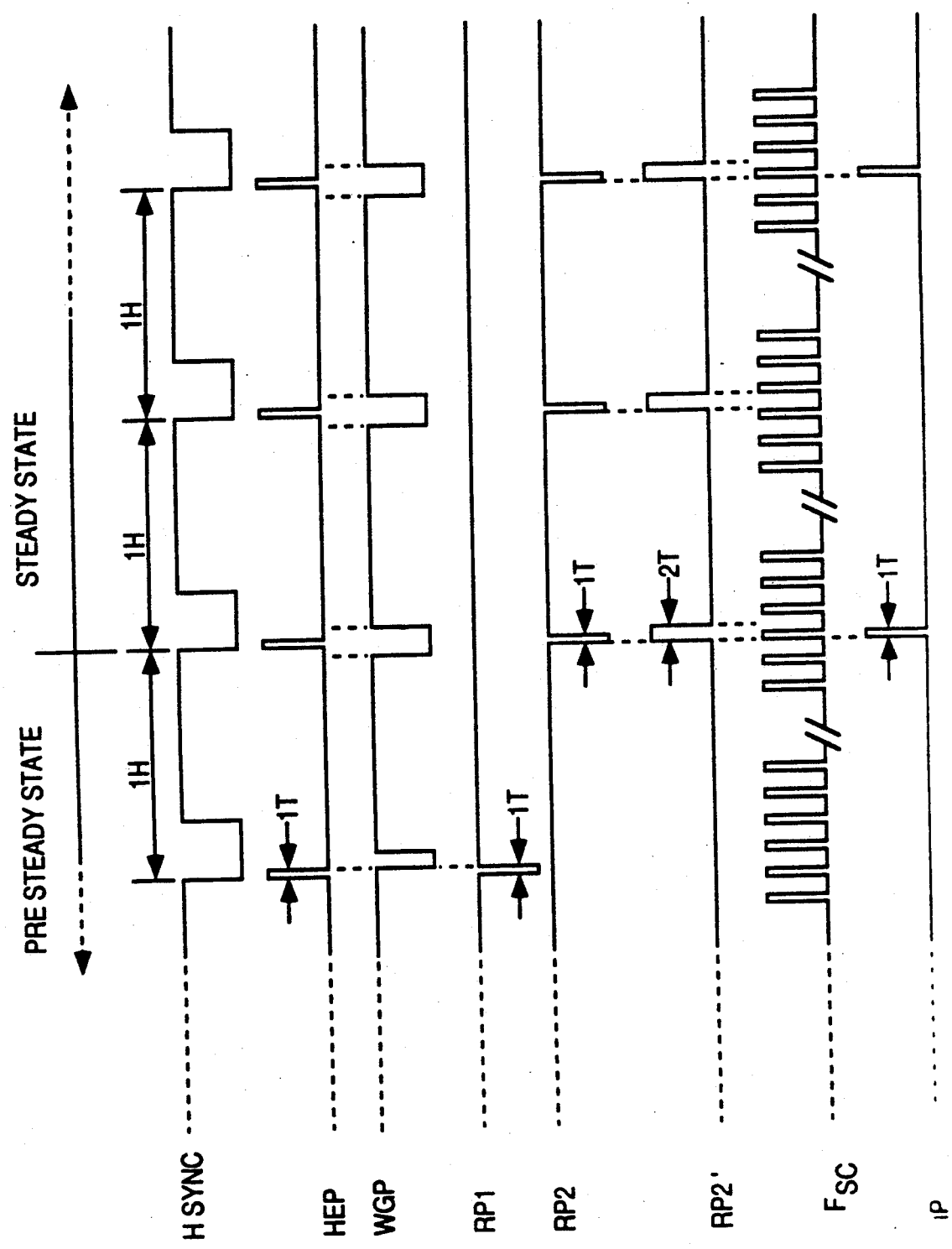

PHASE LOCKED SUBCARRIER REGENERATOR

FIELD OF THE INVENTION

This invention relates to a phase locked subcarrier regenerator which regenerates a phase locked subcarrier which may be used in extended definition television systems.

BACKGROUND OF THE INVENTION

Recently much effort has been directed to the development of extended definition television (hereinafter referred to as EDTV) systems which are compatible with conventional color television receivers and also provide extended definition images. Generally, in the EDTV systems more information may be processed than in conventional TV systems, for example, to improve the resolution. To this end, additional subcarriers may be used in the EDTV systems in addition to a normal color subcarrier. The additional subcarriers may be used, for instance, for up/down conversion in frequency and further as modulated carriers. One exemplary use of additional subcarriers is described in U.S. patent application Ser. No. 139,340, entitled "Extended Definition Widescreen Television Signal Processing System", filed in the U.S. Patent and Trademark Office on Dec. 29, 1987 in the name of M. A. Isnardi. These additional subcarriers are used both at the signal transmitting and receiving ends of the system. In this case, the additional subcarriers regenerated at the signal receiving side must be regenerated in a predetermined phase relationship with the additional subcarriers at the signal transmitting side.

In some systems, therefore, it is intended to send phase reference information used at the receiving side when regenerating the additional subcarriers transmitted from the transmission side. In other systems, however, it may be difficult to send phase reference information for use in generating the additional subcarriers, because of the restrictions on channel bandwidth or lack of sufficient space in the horizontal blanking period. It is therefore desirable to provide a subcarrier regenerator which can regenerate the additional subcarriers with the predetermined phase relationship between the signal transmitting and receiving sides without transmitting the phase reference information. It is further desirable that this subcarrier regenerator be phase locked to a known reference and be of relatively simple circuit construction.

SUMMARY OF THE INVENTION

In accordance with principles of this invention, the frequency of an additional subcarrier is selected so that it may have a greatest common multiple with the frequency of the color subcarrier of a composite video signal. It is assumed that the additional subcarrier has a predetermined phase relationship with the color burst of the composite video signal. Apparatus is provided, which is coupled to receive a color subcarrier signal phase locked to the color burst and a horizontal synchronization signal, and is responsive to a clock signal for providing an initialization pulse. A counter coupled to receive the initialization pulse and responsive to the clock signal is arranged to generate a memory read address signal. A memory means, preprogrammed with a series of sampled data representing the additional subcarrier to be regenerated, is coupled to receive the memory read address signal for regenerating the subcarrier signal.

BRIEF DESCRIPTION OF THE DRAWINGS

FIG. 3 is a block diagram of the phase-locked subcarrier regenerator constructed according to the principle of this invention.

FIG. 4 is a block diagram of an embodiment of the initialization pulse generator shown in FIG. 3.

FIG. 5 is a timing chart useful for understanding the operation of the initialization pulse generator shown in FIG. 4.

DETAILED DESCRIPTION

Figure 1:
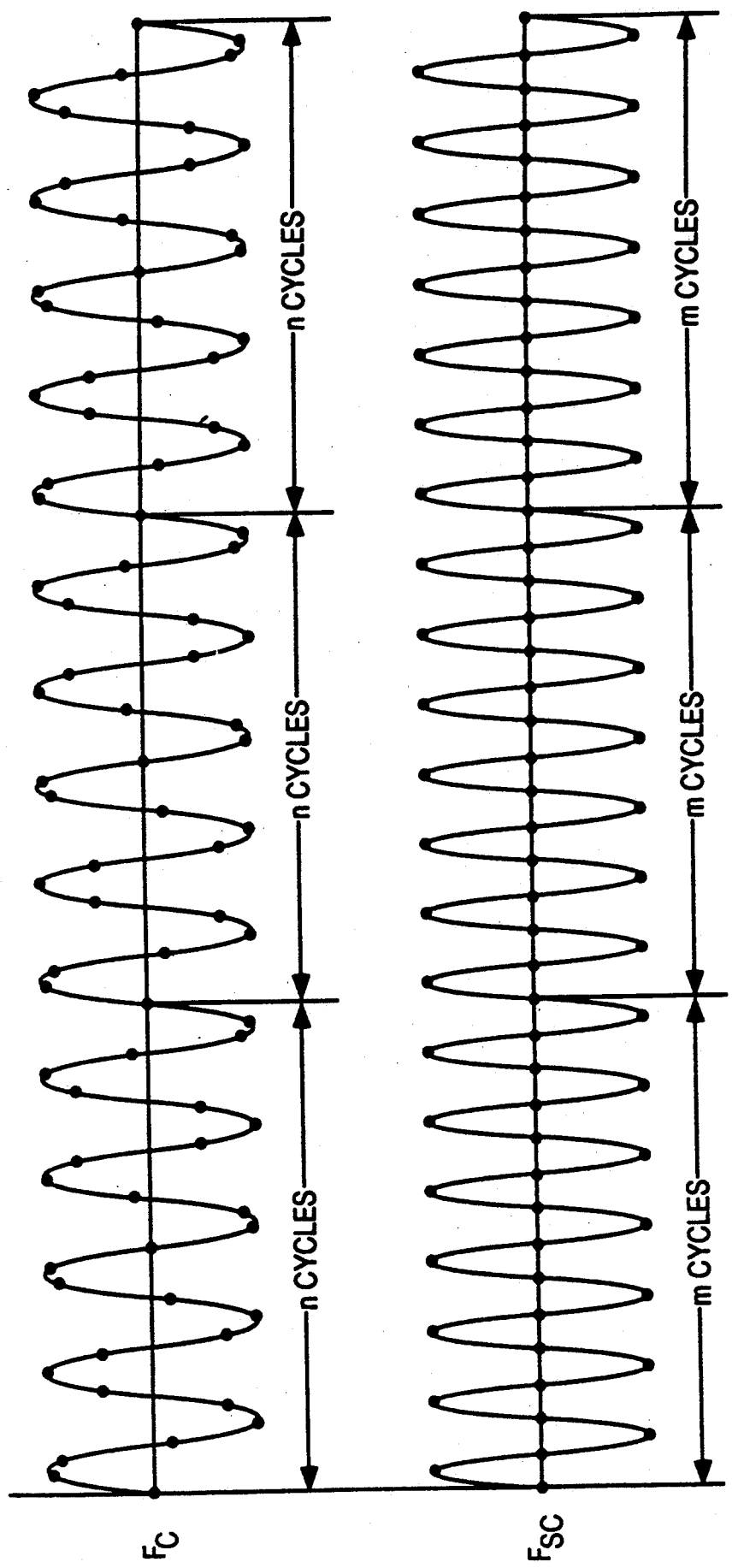
FIG. 1 is a timing diagram showing the relationship between an additional subcarrier signal Fc with the frequency fc and a color subcarrier signal Fsc with the frequency fsc.

In the following explanations, it is assumed for the convenience of explanation that the additional subcarrier frequency fc is an integer multiple of ½ of the horizontal line frequency fH in the NTSC television system, and that composite video signals are sampled at a rate of four times the color subcarrier frequency fsc (3.58 MHz) i.e., 4fsc. For standard NTSC TV signals, the color subcarrier frequency is set at 455/2 times the horizontal line frequency fH. The frequencies fc and fsc can be given by the following equations.

$$fc = (fH/2) \times N \quad (1)$$

$$fsc = fH \times 455/2 = (fH/2) \times 455 \quad (2)$$

where N is a positive integer. If a greatest common multiple K exists between the additional subcarrier frequency fc and the color subcarrier frequency fsc, the equations (1) and (2) are expressed as below.

$$fc = (fH/2) \times (n^*K) \quad (3)$$

$$fsc = (fH/2) \times (m^*K) \quad (4)$$

where n and m are positive integers.

From the equations (3) and (4), the following equation can be derived.

$$fc/fsc = n/m \quad (5)$$

FIG. 1 shows the frequency relationship between the additional subcarrier signal Fc of the frequency fc and the color subcarrier signal Fsc of the frequency fsc. The small circles shown in FIG. 1 represent sampling points. As can be seen from FIG. 1, n cycles of the subcarrier signal Fc of the frequency fc correspond to the m cycles of the color subcarrier signal Fsc of the frequency fsc. Therefore, if the burst component of the composite video signal is utilized to generate a phase locked sampling clock at the frequency of 4fsc, the signal Fc of frequency fc can be regenerated by repeatedly using a series of sampled data in which the n cycles of the signal Fc are composed of 4 m sampled data. For instance, when the frequency fc of the additional subcarrier is selected to be 385 (N=385) times ½ of the horizontal line frequency, $$fc = (fH/2) \times 385$$
$$= (fH/2) \times 5 \times 7 \times 11$$
$$= 3.03 \text{ MHz.}$$

On the other hand, $$fsc = (fH/2) \times 455$$
$$= (fH/2) \times 5 \times 7 \times 13.$$

Therefore, n=11, and m=13.

In this case, 11 cycles of the subcarrier signal Fc is composed of 52 samples.

In another example, when the frequency fc of the additional subcarrier is selected to be 637 (N=637) times ½ of the horizontal line frequency, $$fc = (fH/2) \times 637$$
$$= (fH/2) \times 7 \times 7 \times 13$$
$$= 5.01 \text{ MHz.}$$

On the other hand, $$fsc = (fH/2) \times 5 \times 7 \times 13.$$

Therefore, n=7, and m=5.

In this case, 7 cycles of the subcarrier signal Fc is composed of 20 samples.

Next, the principle of phase synchronization will be explained. The phase relationship between a signal having a frequency which is an odd number of times fH/2 and a vertical synchronization signal, is cyclical every four fields. In addition, the phase relationship between a signal having a frequency which is an odd number of times fH/2 and a horizontal synchronization signal, repeats every two horizontal line periods. Accordingly, the signal with a four-field sequence can be generated by detecting the phase relationship between the color subcarrier and the horizontal synchronization signal at every 2 horizontal line periods and establishing the phase of the signal having the frequency fc on the basis of the resultant phase relationship.

Figure 2:
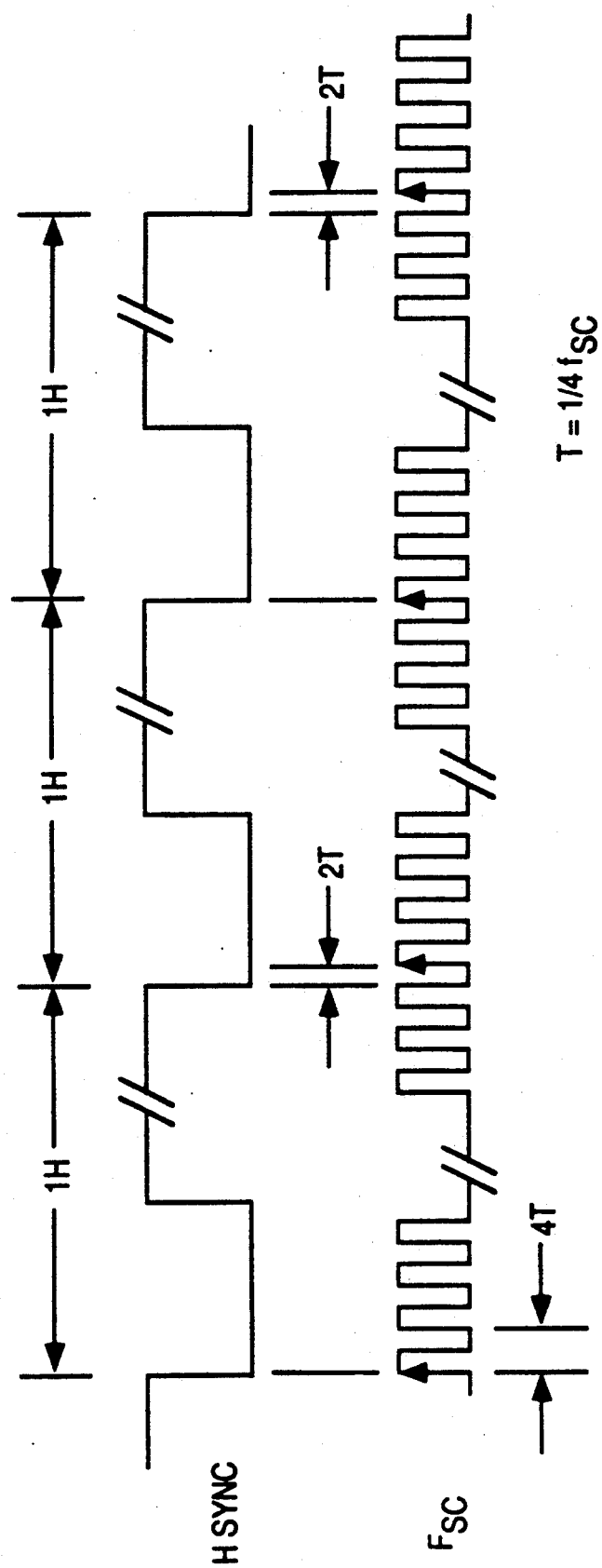
FIG. 2 is a timing diagram showing the phase relationship between the horizontal synchronization signal H SYNC and the color subcarrier signal Fsc.

FIG. 2 shows the phase relation between the horizontal synchronization signal H SYNC and the color subcarrier signal Fsc. As shown in FIG. 2, the case where the color subcarrier Fsc rises within 2T from a falling edge of the horizontal synchronization signal H SYNC and the case where it rises after 2T from the falling edge thereof occur at every other horizontal line period (where T is one quarter of the period of the clock Fsc). Therefore, by predetermining a sample value, which corresponds to the phase of the additional subcarrier signal Fc that starts with the rising edge of the color subcarrier signal Fsc rising within 2T from the falling edge of the horizontal synchronization signal H SYNC, (i.e., a value that is predetermined at the signal transmitting side), the four-field sequence can be maintained and the additional subcarrier signal Fc with the frequency an odd number times fH/2 can be regenerated under the phase relation predetermined between the signal transmitting and receiving sides. Further, the phase relation between the signal with a frequency that is an even number times fH/2 and the horizontal synchronization signal, is the same at every horizontal line period, and as in the case of the signal with the frequency an odd number times fH/2, it is obvious that the signal having a four-field sequence can be generated by detecting the phase relation between the color subcarrier and the horizontal synchronization signal at every two horizontal line periods and determining the phase of the signal with the frequency fc on the basis of the detected phase relation.

FIG. 3 shows a generalized block diagram of the phase locked subcarrier regenerator constructed according to the principle of this invention. An initialization pulse generator 10 receives a color subcarrier signal Fsc which is assumed to be phase locked to the color burst of the composite video signal, and a horizontal synchronization signal H SYNC, and generates an initialization pulse IP under the control of a clock signal CLK having a frequency of 4fsc also phase locked to the color burst. This initialization pulse IP is applied to a read address counter 12. The read address counter 12 is initialized by the initialization pulse IP and starts counting from zero under the control of the clock signal CLK, having the frequency of 4fsc. The count value output CVO, from the read address counter 12, is applied as a read address to a memory 16 which may be a read-only memory (ROM).

The count value output CVO from the read address counter 12 is also applied to a decoder 14. The decoder 14 generates a reset pulse RP, to reset the read address counter 12, when the output from the read address counter 12 becomes 4 m−1. On receiving the reset pulse RP, the read address counter 12 is reset in synchronization with the clock pulse immediately after the reset pulse, and restarts counting from zero and is reset again after it counts up to 4 m−1. The memory 16 is preprogrammed at successive address locations 0, 1, 2,... 4 m−2, 4 m −1 with a series of sampled data, representing the additional subcarrier signal Fc to be regenerated. The starting point, i.e., the initial phase, of the regenerated subcarrier signal Fc composed of the sampled data read out from the memory 16 is determined by the initialization pulse IP generated from the initialization pulse generator 10.

FIG. 4 shows a preferred embodiment of the initialization pulse generator 10 shown in FIG. 3. This initialization pulse generator 10 includes a counter 20, a window gate circuit 22, a decoder 24, a pulse forming circuit 34, and a pulse stretcher circuit 40. The pulse forming circuit 34 includes delay elements 26 and 28, an inverter circuit 30 and an AND gate 32. The pulse stretcher circuit 40 includes a delay element 36 and a NAND gate 38. (the delay time of each delay element 26, 28 or 36 is 1T, i.e., ¼ fsc.) Further the initialization pulse generator 10 includes a NAND gate 42, an AND gate 44 and a delay element 46. The delay element 46 is provided to compensate for the processing time required in the system.

The operation of the circuit shown in FIG. 4 will be described in with reference to the timing chart shown in FIG. 5. Firstly, its operation before the system enters the steady state will be explained e.g., when the power source is turned on or a receiving channel is changed. The pulse forming circuit 34, responsive to the negative-going transitions of the horizontal synchronization signal H SYNC generates edge pulses HEP. Prior to synchronization the edge pulse HEP occurs during the period when the window gate signal WGP from the window gate circuit 22 is at a high level, as shown in FIG. 5. Accordingly, a negative-going reset pulse RP1 is generated by the NAND gate 42 in synchronization with the edge pulse HEP. The system enters the steady state when the counter 20 is reset by the negative-going reset pulse RP1. Incidentally, the window gate circuit 22 generates a part of the window gate signal WGP immediately after the counter 20 is reset by RP1. Successive edge pulses HEP, generated after the counter 20 is reset by the reset pulse RP1 occur when the window gate signal WGP from the window gate circuit 22 is at a low level. Consequently, after the system enters the steady state, the edge pulses HEP are inhibited by the window gate signal WGP.

Next, the operation after the system enters the steady state will be explained. The negative-going horizontal synchronization signal H SYNC is applied to the delay element 26 of the pulse forming circuit 34. The horizontal synchronization signal H SYNC delayed by 1T (i.e., ¼ fsc) by the delay element 26 is applied to the delay element 28 and the inverter circuit 30 connected in parallel with each other. The output signals generated from the delay element 28 and the inverter circuit 30 are applied to the AND gate 32 respectively. Accordingly, the AND gate 32 generates a positive-going pulse HEP which is delayed by 1T from the falling edge of the horizontal synchronization signal H SYNC and has a pulse width of 1T. This pulse is shown as HEP in FIG. 5. This positive-going pulse is applied to one input terminal of the NAND gate 42. The gate signal WGP from the window gate circuit 22 is applied to the other input terminal of the NAND gate 42. The window gate circuit 22 receives the count value output CVO from the counter 20, decodes it and generates the window gate signal WGP. In this embodiment, the window gate circuit 22 generates a low-level window gate signal WGP during a 4-clock-period interval when the count value output CVO is 908, 909, O and 1. This low-level gate signal WGP inhibits the edge pulse HEP of the horizontal synchronization signal H SYNC when the system is in the steady state, so that the counter 20 is not reset by the reset pulse RP1. This ensures that the counter 20 is not reset in synchronization with the edge pulse HEP insofar as there are no significant frequency deviations in the signal H SYNC.

The counter 20 is clocked by the clock signal CLK having the frequency of 4fsc and used to accurately count pulses generated during 1 horizontal line period. The count value output CVO from the counter 20 is applied to the window gate circuit 22 as well as the decoder.

The decoder 24 decodes the count value output CVO from the counter 20 and, in this embodiment, applies the reset pulse RP2 with a pulse width of 1T (¼ fsc) to a second reset input terminal RET2 of the counter 20 when the count value becomes 909. The counter 20 is reset to 0 by the clock pulse generated immediately after the reset pulse RP2 applied to the second reset input terminal RET2, and resumes counting. In the operation of the steady state, since resetting the counter 20 by the edge pulse HEP is inhibited by the window gate signal WGP, the counter 20 is reset only by the reset pulse RP2. In this way, the counter 20 repeats counting from 0 to 909 under the control of the clock signal CLK.

The output from the decoder 24 is also applied to the pulse stretcher circuit 40 for stretching the pulse width by 1T. Specifically, the output from the decoder 24 is applied directly to the first input terminal of NAND gate 38 and to the second input terminal of NAND gate 38 via the delay element 36 having a delay of 1T. Consequently, a positive-going output pulse with a width of 2T, as shown as RP2' in FIG. 5 is obtained from the NAND gate 38. This output pulse is generated every horizontal line period and applied to the first input terminal of the AND gate 44. The color subcarrier signal Fsc with its phase locked to the color burst is applied to the second input terminal of the AND gate 44. In this embodiment, it is assumed that the color subcarrier Fsc is formed into a pulse chain with pulse widths of IT as shown in FIG. 5. As mentioned previously referring to FIG. 2, the color subcarrier signal Fsc rises with the falling edge of the horizontal synchronization signal H SYNC within 2T at every other horizontal line period. Therefore, the AND gate 44 generates a pulse signal with a 1T pulse width once every 2 horizontal line periods. This pulse signal is applied as the initialization pulse 1P to the read address counter 12 shown in FIG. 3 via the delay element 46 for adjusting the phase required in the system.

An embodiment according to this invention has been described. However, several modifications may be contemplated. For regenerating a field alternate subcarrier Fc' in which the phase is inverted every field, for instance, it can be regenerated by using a conventional field discrimination circuit (because the phase relation between the horizontal and vertical synchronization signals are different in odd and even fields) to generate field discrimination signals and invert the phase from the even field to the odd field. An alternative method to generate the field alternate subcarrier signal Fc' is to store in memory the sampled data corresponding to the odd and even fields are and to apply the field discrimination signal as part of the read address signal, applied to the memory. In this manner the sampled data can be read out according to the odd and even fields respectively.

What is claimed is:

1. A phase locked frequency signal generator, comprising:
   a source of a clock signal;
   an initialization pulse generating means coupled to receive a color subcarrier signal which is phase locked to a color burst and a horizontal synchronization signal, and responsive to said clock signal for generating an initialization pulse;
   means coupled to receive said initialization pulse and responsive to said clock signal for generating a memory read address signal; and
   memory means programmed at respective memory locations with a series of sampled data representing a frequency signal to be generated, the frequency of said frequency signal having a predetermined relationship with the frequency of said clock signal, said memory means being coupled to receive said memory read address signal for generating the frequency signal consisting of said sampled data.

2. The phase locked frequency generator set forth in claim 1 wherein said means for generating said memory read address signal comprises:
   a counter having at least one reset input terminal, a clock input terminal, and having an output terminal for providing count values corresponding to said read address signal;
   a decoder coupled to said output terminal for detecting a predetermined count value and generating a reset signal responsive thereto; and
   means for coupling said initialization pulse and said reset pulse to said at least one reset input terminal.

3. The phase locked frequency generator set forth in claim 1 wherein said initialization pulse generating means includes;
- means including counting means, responsive to said clock signal, for generating a pulse signal at predetermined intervals; and
- means responsive to said pulse signal and said color subcarrier signal for providing said initialization pulse in accordance with a predetermined phase of said color subcarrier signal.

4. A phase locked frequency signal generator for generating a signal of frequency fc phase locked to a signal of frequency fsc, where fc is equal to n/m times fsc, and n and m are integers, said generator comprising:
- a terminal for receiving a clock signal of frequency k times fsc, where k is an integer;
- a counter, responsive to said clock signal, for sequentially counting modulo k times m, to repeatedly generate a series of memory read address values; and
- memory means, programmed with data at respective address locations corresponding to amplitude values of said signal of frequency fc, and responsive to said memory read address values, for providing at an output thereof a sequence of data representing a binary representation of said signal of frequency fc.

5. The phase locked frequency generator set forth in claim 4 wherein said counter for generating said memory read address values comprises:
- a counter having at least one reset input terminal, a clock input terminal, and having an output terminal for providing count values corresponding to said read address values;
- a decoder coupled to said output terminal for detecting a predetermined count value and generating a reset signal responsive thereto; and
- means for coupling said reset signal to said at least one reset input terminal.

6. The phase locked frequency generator set forth in claim 5 further including:
- an initialization pulse generating means coupled to receive a signal of frequency fc, which is phase locked to a color burst, and a horizontal synchronization signal, and responsive to said clock signal for generating an initialization pulse; and
- means for coupling said initialization pulse to said at least one reset input terminal.

* * * * *

UNITED STATES PATENT AND TRADEMARK OFFICE
CERTIFICATE OF CORRECTION

PATENT NO. : 5,021,872

DATED : June 4, 1991

INVENTOR(S) : Shinichi Shiratsuchi

It is certified that error appears in the above-identified patent and that said Letters Patent is hereby corrected as shown below:

Column 6, line 63, before "read" insert --memory--.

Signed and Sealed this

Twenty-second Day of December, 1992

Attest:

DOUGLAS B. COMER

*Attesting Officer*     *Acting Commissioner of Patents and Trademarks*